Dec. 29, 1953 W. R. BENNETT 2,664,504

CATHODE-RAY DECODER FOR PULSE CODE MODULATION

Filed April 11, 1950

INVENTOR
W. R. BENNETT
BY George C. Ford
ATTORNEY

Patented Dec. 29, 1953

2,664,504

UNITED STATES PATENT OFFICE 2,664,504

CATHODE-RAY DECODER FOR PULSE CODE MODULATION

William R. Bennett, Summit, N. J., assignor to Bell Telephone Laboratories, Incorporated, New York, N. Y., a corporation of New York Application April 11, 1950, Serial No. 155,338

8 Claims. (Cl. 250—27)

Figure 1:
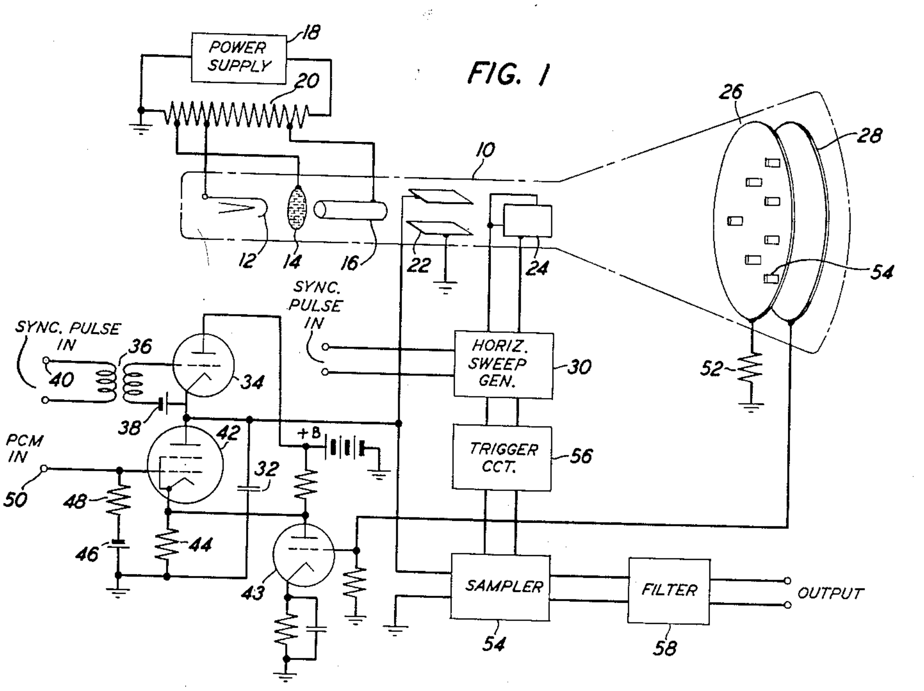

This invention relates to decoding apparatus for pulse code modulation and more particularly to cathode-ray tube decoders.

In the art of transmission by pulse code modulation, a message wave to be transmitted is periodically sampled at a rate which is of the order of at least twice the lowest frequency which it is desired to transmit and information as to the amplitude of the successive samples is transmitted in code form using a permutation code having a fixed number of code elements. One such code employs pulses of either of two values, usually "on" and "off" pulses, and an arrangement of code groups analogous to the binary system of numeration often used in computing machines. Each code element when represented by one of these pulse values indicates the presence in the sample of a certain component portion of the total possible amplitude expressible by the code. When the code element is represented by a pulse of the other value, it signifies the absence of the particular portion of the amplitude of the sample represented by the code group.

Various systems have been proposed for transmitting voice signals and other message information by pulse code modulation. A detailed description of a typical system may be found in the Bell System Technical Journal for January 1948 under the title of "An Experimental Pulse Code Modulation System of Toll Quality" by L. A. Meacham and E. Peterson.

Heretofore it has been usual to decode received pulse code groups through the use of some form of integrating circuit to which is applied a quantity for each received code element which is weighted to represent the portion of the total possible amplitude corresponding to that code element. Integration of the quantities for the several elements of a code group produces a new quantity the amplitude of which is proportional to the amplitude of the sample which gave rise to the code group at the transmitter. These reconstituted samples may be transmitted through a low-pass filter to obtain a replica of the original message wave. The most common decoding device thus far employed has involved the use of a storage capacitor and discharge circuit. In this circuit, the capacitor, having been initially discharged, is charged in equal quantities upon the receipt of each code element pulse of one value and allowed to discharge continuously at such a rate that during the interval between successive code elements the charge has decreased by one-half that present at the beginning of the interval. When this type of decoder is employed, the reconstituted samples are representative of the samples applied to the coder at the transmitter. If compression was introduced at the transmitter, the reconstituted signal must be applied to an expander to obtain a true reproduction of the message wave.

It is an object of the present invention to provide a decoding circuit which is effective both to decode pulse code groups and to compensate for compression which may be introduced at the transmitter of a pulse code modulation system.

To this end and in accordance with the invention, a pulse code modulation decoder is provided which comprises a cathode-ray tube having a target field toward which a beam of electrons may be projected. This target field includes targets arranged in columns corresponding to the elements of the code to be received and spaced to represent certain of the "on" pulses of the code group for each of the possible amplitudes which may be represented by the code. The electron beam is swept to fall within each column during receipt of the corresponding element of the code and is deflected within the column in response to each "on" pulse received until it reaches the next target in that particular column. The beam thus proceeding stepwise across the target array reaches a position in the final column which measured from the bottom of the column is representative of the amplitude corresponding to the received code group.

In other embodiments of the invention the several rows of targets corresponding to the code groups of the code are separated by unequal amounts. The particular arrangement of spacing so employed may be in accordance with a characteristic which is the inverse of any particular compression characteristic employed at the transmitter of a pulse code modulation system. In such instances the decoder of the invention not only reconstitutes message wave samples from the code groups transmitted, but in addition introduces expansion which is complementary to the compression introduced at the transmitter.

Figure 2:
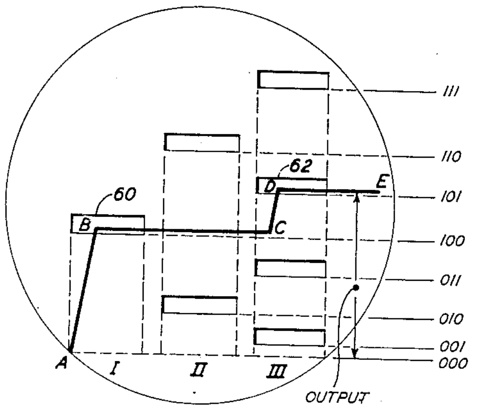

The above and other features of the invention will be described in detail in the following specification taken in connection with the drawings in which:

Fig. 1 is a circuit diagram partially in block form of a pulse code modulation decoder in accordance with the invention; and Fig. 2 is a diagram illustrative of an alternative arrangement of the decoding target array for the decoder of Fig. 1.

The decoding system of the invention has been shown by way of illustration in the drawings as adapted for use with a three-element binary permutation code. Such a code permits the unique representation of $2^3$ or eight different amplitude values. The invention is equally applicable to systems employing a larger number of code elements. In the system of Fig. 1 of the drawings a three-element code has been assumed and it has further been assumed that no compression has been introduced at the transmitter of the system. It has also been assumed that the code element representing the largest amplitude component is transmitted first followed by the code elements representing successively smaller amplitude components. Thus, in the three-unit code assumed, "on" pulses in the successive code elements represent respectively four, two and one units of a total amplitude of seven units while "off" pulses for the same code elements represent the absence of such an amplitude portion in each case.

Referring to Fig. 1, there is provided a cathode-ray tube 10 having the usual electron gun structure comprising a cathode 12, a control grid 14 and an accelerating electrode 16. Appropriate potentials for the operation of the tube are derived from a power supply 18 the output of which is applied to a voltage divider 20 in the usual manner. Pairs of deflection plates 22 and 24, respectively, control the vertical and horizontal deflections of the electron beam which is projected along the axis of the tube 10 toward a target plate 26. A collector plate 28 is positioned parallel to the target plate and on the opposite side thereof from the electron gun system.

The target plate is provided with rows of target areas which correspond to the values of the code elements to represent the several code groups of the code employed. In the particular arrangement of Fig. 1 "on" code elements of each code group are represented by a perforation or target opening in the plate while the "off" elements are represented by the absence of such perforation. The code elements are represented by the vertical columns of perforations beginning at the left and extending to the right of the target structure, while the code groups representing successively larger signal amplitudes are arranged vertically beginning at the bottom of the array. The target array shown in Fig. 1 corresponds to the code shown in the following table with the decimal representation of the signal amplitudes as indicated:

111=7
110=6
101=5
100=4
011=3
010=2
001=1
000=0

It will be observed, however, that not all of the "on" pulses are represented in the target array. This results from the omission of targets which would perform no useful function in the decoding process. It will be recalled that deflection of the electron beam in any of the columns corresponding to the code elements is interrupted whenever the beam reaches a target in that column. Thus if a target array corresponding to the table reproduced above is employed, the beam can never be deflected in the left-hand column beyond the fifth row of targets. Similarly, if the beam enters the second column at the bottom, it can never be deflected beyond the third row of targets or if it enters at the center of that column by virtue of deflection in the first column, it can never be deflected beyond the seventh row. The unnecessary target openings are accordingly omitted to give the target array shown in the drawings in which each code element is represented by a column containing at least one target perforation and each code group is represented by a row containing (with the exception of the group 000) at least one target perforation.

It will be understood that other target structures may be substituted for that described. For example, the "on" pulse target areas may be differentiated from those for "off" pulses by providing areas having different amounts of secondary electron emission. Alternatively, a luminous screen may be provided and the target array in such case may comprise an opaque mask with suitably positioned transparent areas.

In the particular embodiment shown in Fig. 1 the several rows of targets representing the code groups are equally spaced in the vertical direction thus rendering the apparatus capable of decoding signals of which the amplitudes of samples applied to the coding device are linearly related to the message wave amplitudes at the sampling times.

As outlined above, the code element targets are positioned across target plate 26 from left to right and the code groups representing the signal amplitudes are arranged vertically in the order of increasing represented amplitudes. Accordingly, a deflection system is provided to sweep the beam from left to right across the target field at such a rate that the beam falls within the column corresponding to a particular element of the code during the time in which that code element is being received. This may be accomplished by a conventional type of deflection circuit commonly used in cathode-ray oscilloscopes. For this purpose, there is provided a horizontal sweep generator 30 arranged to control the potentials of the horizontal deflecting plates 24. This generator is controlled by a synchronizing pulse such as is normally transmitted in pulse code modulation systems and may be obtained for example as shown in the Bell System Technical Journal article referred to above. This synchronizing pulse, which may conveniently for the purpose of the present description, be assumed to occur once for each code group, may, for example, trigger a saw-tooth wave generator the output of which is applied to the horizontal deflection plates, the generator having a time constant chosen to sweep the beam horizontally across the target area once during the receipt of each code group.

The same synchronizing pulse is also employed to control a vertical deflection circuit which determines the potential applied to vertical deflection plates 22. This vertical deflection circuit includes a storage capacitor 32 which may be charged to a potential indicated at B+ each time a synchronizing pulse is received. To this end storage capacitor 32 is connected between the cathode of a vacuum tube 34 and ground. The anode of vacuum tube 34 is connected to the source of potential indicated at B+ while the control grid is connected to the cathode of the tube through the secondary winding of transformer 36 and a bias battery 38. The primary winding of transformer 36 is connected to terminals 40 to which the synchronizing pulse is applied. The synchronizing pulse applied to terminals 40 is the same as and may be obtained from the same source as that applied to the terminals of the horizontal sweep generator. The value of the potential supplied by bias battery 38 is sufficient to maintain tube 34 cut off except during the receipt of a synchronizing pulse. When such a pulse is received, tube 34 becomes conductive and capacitor 32 is charged essentially to the full value of the potential at B+. Thereafter the charging tube 34 is cut off for the duration of the decoding cycle. The potential thus stored in storage capacitor 32 at the beginning of a cycle of operation is taken as equivalent to the full amplitude range of which the code employed in the system is capable. This potential is applied directly to one of the vertical deflection plates 22 and normally deflects the electron beam to a position to strike the target area at the bottom in the row corresponding to the code value 0 as shown in the table above.

A discharge control circuit is provided for capacitor 32 to cause vertical deflection of the electron beam whenever an "on" code element pulse is received and to prevent such deflection when "off" pulses are received. This circuit includes a vacuum tube 42 connected across capacitor 32, the anode of the tube being connected to one terminal and the cathode of the tube being connected to the other terminal of the capacitor through a resistor 44. A bias voltage supplied by a battery 46 and applied to the control grid of the tube through a resistor 48 normally maintains the tube at or below cut-off, thus preventing the discharge of the condenser. Whenever a code element is represented by an "on" pulse a positive pulse which may be assumed to have an amplitude of $e$ appears at terminal 50 and is applied to the control grid of tube 42 to permit conduction therethrough. Thus for the duration of the code element pulse the electron beam is deflected vertically over the target plate 26. The velocity of vertical deflection must be sufficiently high to permit deflection from the bottom to the top of the target array during the code pulse causing the deflection and thus during the time that the beam remains within the corresponding column of target areas.

A further control is provided, however, for the deflection of the electron beam in this direction. For this purpose the collector plate 28 positioned behind the target field is connected to the cathode of control tube 42 through a phase inverting amplifier stage 43. By virtue of the phase inversion afforded by amplifier 43 and suitable adjustment of the parameters of the circuit, a voltage of $+e$ is applied to the cathode of the control tube whenever the electron beam traverses one of the openings in the target plate 26 and impinges upon the collector plate 28. This voltage is taken as equal to the positive voltage $e$ which is applied to the control grid of the same tube whenever an "on" pulse occurs in the received code group. Conveniently, the negative bias effective at the grid as supplied by bias battery 46 also may have an amplitude of $e$.

The control of the vertical deflection of the electron beam may now be summarized. Considering, for example, deflection of the beam in the left-hand column which corresponds to the highest order code element of the code and assuming that an "on" pulse occurs for this code element in the received code group, it will be understood that the positive voltage of amplitude $e$ appears upon the control grid of control tube 42. This balances the $-e$ bias voltage from battery 46 and permits the flow of anode current in the tube. The resulting discharge of the storage capacitor 32 causes the electron beam to begin a vertical deflection from its rest position. As long as the beam impinges upon target plate 26 the electrons are drawn off to ground through a resistor 52. When, however, the beam reaches a perforation in the target plate, as for example perforation 54, it passes therethrough and impinges upon collector plate 28. This results in the application of a negative voltage to the control grid of amplifier 43. This voltage is amplified and is applied as a voltage of amplitude $+e$ to the cathode of the tube. Assuming a continued existence of the code pulse at terminal 50, the total voltage between the grid and cathode effective to control the conducting condition of the tube 42 is $-e$ ($+e$ from the code pulse and $-2e$ obtained half from bias battery 46 and half from collector plate 28) which cuts off the tube and therefore interrupts vertical deflection of the beam.

Bearing in mind the operation of the vertical control system, it will be recalled that the electron beam starting from a rest position at the lower left-hand side of the target array is swept horizontally to the right. If an "on" pulse occurs for a particular code element vertical deflection of the beam is initiated, this deflection continuing at a rate which is high compared to the rate of horizontal deflection until the beam passes through one of the target openings in the corresponding column. When this occurs further vertical deflection of the beam is prohibited and continued horizontal deflection moves the beam into the column corresponding to the next element of the code. If an "off" pulse is received for this code element, no further vertical deflection of the beam occurs and it is deflected into the final column corresponding to the third element of the code. If, on the other hand, an "on" pulse is received, the beam is again deflected vertically, this time in the second column, until it traverses a target opening. When this occurs the beam is shifted to the final column without further vertical deflection. Here, depending upon whether or not a code element pulse of "on" value is received in the particular code group to be decoded the beam will or will not undergo further vertical deflection. The position which the beam occupies in the final column of the target array at the conclusion of the code group which is being decoded is a measure of the amplitude of the sample to which the code group corresponds. This can be seen by reference to the table given above and will be explained in greater detail in connection with Fig. 2 of the drawing.

At the conclusion of the electron beam deflection process outlined above the total deflection of the beam is measured by sampling the charge remaining in storage capacitor 32. This is accomplished by a conventional sampling circuit 54 which may conveniently be of the type disclosed at page 27 of the article referred to above. Control pulses for the operation of sampler 54 may conveniently be derived from the horizontal sweep generator 30 through the use of a trigger circuit 56 which may be an Eccles-Jordan or flip-flop circuit of the type shown, for example, in "Theory and Application of Electron Tubes," Second Edition, by H. J. Reich at page 353. The bias voltages for the trigger circuit are adjusted so that it will be triggered when the sawtooth wave of the horizontal sweep generator reaches its maximum value corresponding to deflection of the beam to the final code element column. It is recognized that the value obtained by sampling the charge remaining upon storage capacitor 32 is actually the difference between the sample amplitude represented by the code and the total possible amplitude which may be represented by the code. This, however, is the equivalent of a 180-degree phase shift and is unimportant where voice signals are involved. It is obvious, of course, that if the phase inversion so introduced is objectionable, it may be eliminated through the interposition of a single stage of amplification. The output of sampler 54 comprises a series of pulses, one for each received code group, the amplitudes of which correspond respectively to the sample amplitudes employed at the transmitter in the production of the code groups received. These pulses are applied to a low-pass filter 58 which may, for example, comprise a combination of capacitive and inductive elements as illustrated in "Radio Engineers' Handbook" by F. E. Terman, beginning at page 228 to remove frequency components corresponding to the sampling rate and other higher frequency components thereby to obtain a reproduction of the message wave originally applied at the transmitter.

A typical path which might be traversed by the beam of the decoder is illustrated by the trace ABCDE of Fig. 2 which is a schematic representation of the target array as seen from the electrode gun of the decoding tube. In the construction of this drawing it has been assumed that the received code group was 101 which, by reference to the table above, is seen to represent a sample which has an amplitude expressed decimally as 5. Also, it will be recalled from the above that "on" pulses received in the code elements represented respectively by columns I, II and III of the target correspond to amplitude components of 4, 2 and 1 units.

In the decoding of the code group 101, therefore, the electron beam is deflected along the line AB in the first column (I) in response to the receipt of an "on" pulse for the corresponding element of the code. Upon reaching point B, the beam strikes target 60 and, through the mechanism already described, vertical deflection of the beam is interrupted. Horizontal deflection of the beam continues without interference, however, so that the beam reaches column II at the time the second element of the code is received.

Inasmuch as the code element corresponding to column II is represented in the particular code group chosen for illustration by an "off" pulse, the electron beam continues its horizontal deflection from B, in column I, to C in column III without further vertical deflection. An "on" pulse is received as the electron beam reaches C in column III and consequently the beam is caused to resume its vertical deflection which continues until the beam impinges upon target 62 at D. Vertical deflection is again interrupted and the beam is deflected horizontally along the line DE until the code group period ends. At this time, the horizontal deflection of the beam across the target field is complete and the total vertical deflection, indicated by the arrow labeled "output" is measured by the sampling process referred to in connection with Fig. 1.

As has been indicated above, the cathode-ray decoder of the invention finds particularly advantageous application when compression is employed in a pulse code modulation system to increase the volume range which may be accommodated. In such instances the values represented by successive code groups of the code are not linearly related to the sampled amplitudes of the message wave. Thus if for low amplitudes there is a 1-to-1 relationship between the amplitude encoded and the absolute amplitude of the message wave, the relationship changes non-linearly until at high amplitudes an instantaneous message wave amplitude of X units may be presented by a sample amplitude to be encoded of X/Y where Y may be of the order of 2 or 3. It is apparent, therefore, that when the sample amplitudes are encoded the resulting code groups are not directly representative of the instantaneous amplitudes of the message wave at the sampling times. If, therefore, these code groups are decoded, compensation, usually termed expansion, must be introduced to eliminate the distortion which otherwise results. This can be easily accomplished in the present system in accordance with one of the important features of the invention. In accordance with the invention, compensating expansion is introduced at the decoder merely by the manner in which the rows of targets corresponding to the several code groups of a code are disposed in the target array. As a result, the decoder of the invention is capable of decoding and simultaneously introducing expansion.

Such a disposition of the rows of target apertures corresponding to the several code groups to obtain expansion is illustrated in Fig. 2. There it will be seen that the rows corresponding to the code groups for amplitudes 0, 1, 2, 3 are more closely spaced than those for the larger amplitudes. The particular characteristic here illustrated is that designed to compensate for a compression characteristic in which the high amplitudes in particular are greatly compressed and a reasonably linear relation is maintained for the middle amplitude range. Obviously any desired spacing of the target rows may be employed so that expansion complementary to any particular compression characteristic may easily be obtained

What is claimed is:

1. In a decoder for code groups of a fixed number of elements each of a plurality of values and in one value representing a fixed portion of the amplitude of a message wave sample, a cathode-ray tube, means for producing a beam of electrons therein, an array of targets arranged in columns corresponding to the elements of the code, means for sweeping the beam to fall within each column during receipt of the code element corresponding thereto, means for deflecting the beam at right angles to the sweep direction in response to code pulses of the one value, means effective when the beam is directed at a target to interrupt deflection of the beam only in the column in which the target is located, and means for producing a quantity representative of the deflection of the beam after its deflection to the target corresponding to the final code element of the group.

2. In a decoder for code groups of a fixed number of elements each of a plurality of values and in one value representing a fixed portion of the amplitude of a message wave sample, a cathode-ray tube, means for producing a beam of electrons therein, targets arranged in rows corresponding to the possible code groups of the code with the corresponding code elements in each row arranged in columns perpendicular to said rows and the distance between adjacent targets in each column proportional to the amplitude portions represented by the code element to which the column corresponds, means for sweeping the beam to fall within each column during receipt of the corresponding code element, means for deflecting the beam at right angles to the sweep direction in response to code pulses of said one value, means effective whenever the beam is directed at a target in a column for interrupting such deflection of the beam, and means for producing a quantity representative of the position of the beam within the column corresponding to the final code element of the code.

3. In a decoder for code groups of a fixed number of elements each of a plurality of values and in one value representing a fixed portion of the amplitude of a message wave sample, a cathode-ray tube, means for producing a beam of electrons therein, a target structure comprising rows of targets corresponding to the code elements arranged to represent the possible code groups of the code with the corresponding elements in each target row arranged in columns perpendicular to said rows in such fashion that the distances between successive adjacent targets in each column are non-linearly related, means for sweeping the beam to fall within each column during receipt of the code element corresponding thereto, means for deflecting the beam within the column whenever the corresponding code element is of said one value, means acting whenever the beam is directed at a target in a column for interrupting such deflection of the beam in that column, and means for producing a quantity which is a measure of the deflection of the beam in the column corresponding to the final element of said code.

4. In a decoder for code groups of a fixed number of elements each of a plurality of values and in one value representing a fixed portion of the amplitude of a message wave sample, a cathode-ray tube, means for producing a beam of electrons therein, a target structure in the path of said beam, means for sweeping said beam across said structure to fall in a different position thereon as each code element is received, means for deflecting said beam in a second direction at right angles to the direction of the first deflection whenever a pulse of said one value is received, targets arranged in each position along the path of deflection of the beam in said direction at intervals corresponding to the portion of the total possible amplitude represented by the corresponding code group element, means to interrupt further deflection of the beam in that position only when deflected in the second direction to reach a target, and means for generating a voltage which is proportional to the extent of the total deflection of the beam in said second direction.

5. In a decoder for code groups of a fixed number of elements each of a plurality of values and in one value representing a fixed portion of the amplitude of a message wave sample, a cathode-ray tube, means for producing a beam of electrons therein, a target structure in the path of said beam, means for sweeping said beam across said structure to fall in a different position thereon as each code element is received, means for deflecting said beam in a second direction at right angles to the direction of the first deflection whenever a pulse of said one value is received, targets arranged in the path of deflection of the beam in the second direction at successive intervals non-linearly related to the portion of the total possible amplitude represented by the corresponding code element, means for interrupting further deflection of the beam in that position only when deflected in the second direction to reach a target, and means for producing a quantity representative of the extent of deflection of the beam in the second direction after its deflection in the position corresponding to the final code element of the group.

6. In a decoder for code groups of a fixed number of elements each of a plurality of values and in one value representing a fixed portion of the amplitude of a message wave sample which has undergone compression prior to encoding, a cathode-ray tube, means for producing a beam of electrons therein, a target structure in the path of said beam, means for sweeping said beam across said structure to fall in a different position thereon as each code element is received, means for deflecting said beam in a direction at right angles to the direction of the first deflection whenever a pulse of said one value is received, targets arranged along the deflection path of the beam upon deflection in the second direction in each of said positions, the targets in each position being separated by amounts proportional to the portion of the total possible amplitude represented by the code element corresponding to that position according to a characteristic which is the inverse of the compression characteristic employed in encoding the signal, means actuated when the beam is directed at a target to interrupt further deflection in the second direction of the beam in that position, and means for generating a voltage which is proportional to the extent of the total deflection of the beam in said second direction.

7. In a decoder for code groups of a fixed number of elements each of a plurality of values and in one value representing a fixed portion of the amplitude of a message wave sample, a cathode-ray tube, means for producing a beam of electrons therein, an array of targets arranged in columns corresponding to the elements of said code, means for sweeping the beam to fall within each column during the receipt of the code element corresponding thereto, a control circuit for deflecting the beam within said columns, said circuit comprising a storage capacitor, means for charging said capacitor to a potential which is proportional of the total possible amplitude of signals to be transmitted over the system, means for discharging said capacitor to deflect the beam within a column whenever a pulse of said one value is received, means for interrupting the deflection of said beam when it is directed at a target, and means for deriving a quantity from said capacitor which is proportional to the extent of total deflection of the beam during the receipt of a code group.

8. In a decoder for code groups of a fixed number of elements each of a plurality of values and in one value representing a fixed portion of the amplitude of a message wave sample, a cathode-ray tube, means for producing a beam of electrons therein, an array of targets arranged in columns corresponding to the elements of said code, means for sweeping the beam to fall within each column during the receipt of the code element corresponding thereto, a control circuit for deflecting the beam within said columns, said circuit comprising a storage capacitor, means for charging said capacitor to a potential which is proportional of the total possible amplitude of signals to be transmitted over the system, means for discharging said capacitor to deflect the beam within a column whenever a pulse of said one value is received, means for interrupting the deflection of said beam when it is directed at a target, and a sampling circuit arranged to measure the charge remaining on said capacitor after completion of the receipt of a code group.

WILLIAM R. BENNETT.

References Cited in the file of this patent

UNITED STATES PATENTS

| Number | Name | Date |
|---|---|---|
| 2,086,904 | Evans | July 13, 1937 |
| 2,173,193 | Zworykin | Sept. 19, 1939 |
| 2,404,106 | Snyder | July 16, 1946 |
| 2,463,535 | Hecht | Mar. 8, 1949 |
| 2,468,100 | Moskowitz | Apr. 26, 1949 |
| 2,473,691 | Meacham | June 21, 1949 |
| 2,496,633 | Llewellyn | Feb. 7, 1950 |
| 2,576,029 | Mohr | Nov. 20, 1951 |